US012110711B2

(12) United States Patent
Lin et al.

(10) Patent No.: US 12,110,711 B2
(45) Date of Patent: Oct. 8, 2024

(54) INTELLIGENT LOCK FOR RECREATIONAL VEHICLE

(71) Applicant: DOVHOV LLC, Atlanta, GA (US)

(72) Inventors: Ligen Lin, Shenzhen (CN); Yamin Zheng, Shenzhen (CN); Qiumei Sun, Shenzhen (CN)

(73) Assignee: DOVHOV LLC, Shenzhen (CN)

( * ) Notice: Subject to any disclaimer, the term of this patent is extended or adjusted under 35 U.S.C. 154(b) by 0 days.

(21) Appl. No.: 18/381,636

(22) Filed: Oct. 19, 2023

(65) Prior Publication Data

US 2024/0044171 A1 Feb. 8, 2024

(30) Foreign Application Priority Data

Sep. 15, 2023 (CN) ......................... 202322521796.2

(51) Int. Cl.

| | |
|---|---|
| ***E05B 13/10*** | (2006.01) |
| ***E05B 15/10*** | (2006.01) |
| ***E05B 17/22*** | (2006.01) |
| ***E05B 47/00*** | (2006.01) |
| *E05B 83/44* | (2014.01) |

(52) U.S. Cl.

CPC ............ *E05B 17/22* (2013.01); *E05B 15/101* (2013.01); *E05B 47/0012* (2013.01); *E05B 2047/0058* (2013.01)

(58) Field of Classification Search

CPC ......... E05B 2047/0058; E05B 47/0012; E05B 15/101; E05B 17/22; Y10T 292/0969; Y10T 292/1023; Y10T 292/1024; Y10T 292/098

See application file for complete search history.

(56) References Cited

U.S. PATENT DOCUMENTS

| | | | | | |
|---|---|---|---|---|---|
| 230,113 | A * | 7/1880 | Curran | E06B 3/44 292/163 |
| 833,900 | A * | 10/1906 | Sigler | E05B 63/20 292/DIG. 20 |
| 1,302,873 | A * | 5/1919 | Stiff | E05B 63/20 292/335 |

(Continued)

FOREIGN PATENT DOCUMENTS

| | | | |
|---|---|---|---|
| CN | 109267840 | A * | 1/2019 |
| CN | 109386180 | A * | 2/2019 |

(Continued)

*Primary Examiner* — Carlos Lugo

(74) *Attorney, Agent, or Firm* — Shen Huang

(57) ABSTRACT

A novel intelligent lock for a recreational vehicle belongs to the technical field of locksets. The novel intelligent lock for the recreational vehicle includes a recreational vehicle lock body; a lock cylinder device is arranged on one side of the recreational vehicle lock body; an electrical control device is arranged in the recreational vehicle lock body; the recreational vehicle lock body is provided with a fingerprint recognition module with an inclination angle; an electronic peep hole capable of observing an external situation is arranged on one side of the fingerprint recognition module; the electrical control device is electrically connected to the fingerprint recognition module and the electronic peep hole; and the electrical control device is connected to the lock cylinder device.

7 Claims, 6 Drawing Sheets

(56) References Cited

U.S. PATENT DOCUMENTS

| | | | | | |
|---|---|---|---|---|---|
| 1,533,619 | A * | 4/1925 | Thompson | B25B 23/0035 81/177.85 |
| 2,178,919 | A * | 11/1939 | Rhein | E05B 63/244 292/341.15 |
| 3,912,309 | A * | 10/1975 | Fischer | E05B 55/005 292/1.5 |
| 5,918,916 | A * | 7/1999 | Kajuch | E05B 63/202 292/169.14 |
| 5,927,769 | A * | 7/1999 | Pullen | E05B 17/2038 292/192 |
| 8,393,187 | B2 * | 3/2013 | Bacon | E05B 59/00 292/216 |
| 8,430,435 | B2 * | 4/2013 | Juga | E05C 21/00 292/341.15 |
| 8,601,839 | B1 * | 12/2013 | Liu | E05B 55/12 70/151 R |
| 9,085,919 | B2 * | 7/2015 | Bacon | E05B 81/77 |
| 9,540,853 | B2 * | 1/2017 | Pickar | E05C 1/14 |
| 9,940,767 | B2 * | 4/2018 | Bacon | E05B 81/66 |
| 10,378,237 | B2 * | 8/2019 | Bacon | G07C 9/00174 |
| 2008/0258867 | A1 * | 10/2008 | Harris | E05B 47/026 280/5.2 |
| 2017/0358160 | A1 * | 12/2017 | Gardiner | G07C 9/00571 |
| 2019/0061946 | A1 | 2/2019 | Bogar et al. | |
| 2021/0193979 | A1 * | 6/2021 | Learmonth | H01M 10/4257 |
| 2021/0222461 | A1 | 7/2021 | Chen et al. | |
| 2022/0235583 | A1 * | 7/2022 | Donahue | E05B 5/003 |
| 2023/0053075 | A1 * | 2/2023 | Lu | E05B 13/10 |
| 2023/0062538 | A1 | 3/2023 | Nolan et al. | |
| 2023/0069249 | A1 * | 3/2023 | Bos | E05B 47/0603 |

FOREIGN PATENT DOCUMENTS

| | | | | | |
|---|---|---|---|---|---|
| CN | 109555361 | A * | 4/2019 | E05B 1/0007 |
| CN | 112832597 | A * | 5/2021 | |
| CN | 114120483 | A * | 3/2022 | |
| CN | 114165109 | A * | 3/2022 | |
| CN | 114241636 | A * | 3/2022 | |
| DE | 19749081 | A1 * | 5/1999 | E05B 47/00 |
| JP | 2001336326 | A * | 12/2001 | E05B 65/108 |
| WO | WO-2022190094 | A1 * | 9/2022 | |

* cited by examiner

INTELLIGENT LOCK FOR RECREATIONAL VEHICLE

TECHNICAL FIELD

The present disclosure belongs to the technical field of locks, and relates to a novel intelligent lock for a recreational vehicle.

BACKGROUND

A recreational vehicle is a vehicle with an interior decoration designed to achieve functions of "accommodating clothes, food, and sleeping stuff and realizing traveling". For privacy reasons, windows of the recreational vehicle are covers, and only a vehicle door are used for getting on and getting off.

A lock mounted on a vehicle door of an existing recreational vehicle has a relatively simple use function, so that the safety is poor. A thief easily gets on the recreational vehicle to steal valuables in the recreational vehicle, and the living standard of people living on the recreational vehicle is affected. An existing recreational vehicle lock is unlocked mainly by mechanical unlocking and password unlocking. In terms of the mechanical unlocking, the vehicle door cannot be opened as a user easily forgets to carry keys or keys are lost. The password unlocking method is relatively troublesome, and a password is easily cracked. When there is someone outside the recreational vehicle knocking at the vehicle door, it is impossible for a user to confirm a situation on the other side of the vehicle door. There is a certain potential safety hazard if the user directly opens the vehicle door, especially at night.

Therefore, it is necessary to design a recreational vehicle lock, which can solve the foregoing problem.

SUMMARY

The present disclosure provides a novel intelligent lock for a recreational vehicle, and aims to solve the problems that an existing recreational vehicle is troublesome in unlocking and using a recreational vehicle lock is low in safety.

In order to achieve the above objective, the present disclosure discloses a novel intelligent lock for a recreational vehicle, including a recreational vehicle lock body; a lock cylinder device is arranged on one side of the recreational vehicle lock body; an electrical control device is arranged in the recreational vehicle lock body; the recreational vehicle lock body is provided with a fingerprint recognition module with an inclination angle; an electronic peep hole capable of observing an external situation is arranged on one side of the fingerprint recognition module; the electrical control device is electrically connected to the fingerprint recognition module and the electronic peep hole; and the electrical control device is connected to the lock cylinder device.

As a preference, the recreational vehicle lock body includes an outer shell, an inner shell, and a handle assembly; the outer shell is detachably fastened and connected to the inner shell; the lock cylinder device is located on a back surface of the outer shell; and the handle assembly is arranged on the outer shell and the inner shell.

As a preference, the lock cylinder device includes a bevel spring bolt, a lock bar, a spring, a connecting rod, and a double locking assembly; the bevel spring bolt capable of extending and retracting laterally and the lock bar are arranged in the outer shell; the lock bar is located on one side of the bevel lock bar; a tail end of the bevel lock bar resists against and is provided with the spring, so that the spring pushes the bevel spring bolt to extend outwards; the double locking assembly is arranged on a rear side of the lock bar; the double locking assembly is movably connected to the lock bar through the connecting rod; and the bevel spring bolt is laterally movably connected to the handle assembly.

As a preference, the handle assembly includes an inner handle and an outer handle; the inner shell is provided with the inner handle connected to a lateral rotating shaft; the outer shell is provided with the outer handle connected to the lateral rotating shaft; a square hole is formed in the bevel spring bolt; an inner swing arm is arranged on one surface of the inner handle; an outer swing arm is arranged on one surface of the outer handle; and a tail end of the inner swing arm and a tail end of the outer swing arm are both located in the square hole, so that when the inner handle is pulled to rotate, the inner swing arm swings to drive the bevel spring bolt to inwards retract, or when the outer handle is pulled to rotate, the outer swing arm swings to drive the bevel spring bolt to inwards retract.

As a preference, a second mechanical lock is arranged on the outer handle; and an end portion of the second mechanical lock is in limiting connection to an inner side end of the outer handle.

As a preference, the double locking assembly includes a rotating column, a manual double locking shank, and a first mechanical lock; the outer shell is provided with the first mechanical lock; a tail end of the first mechanical lock is connected and provided with the rotating column; the inner shell is provided with the manual double locking shank; the manual double locking shank is in fool-proofing plugging with the rotating column; an outer side wall of the rotating column is integrally connected with a protruding portion; and the protruding portion is connected to the connecting rod.

As a preference, the electrical control device includes a control panel, a battery, a toggle switch, a micro motor, a worm wheel, and a worm; the control panel is arranged inside the inner shell; the battery is arranged on one side of the control panel; the toggle switch is arranged on an end surface of the inner shell; the micro motor is fixedly mounted in the outer shell; an output end of the micro motor is connected and provided with the worm; the outer side wall of the rotating column is fixedly sleeved with the worm wheel with oblique teeth; the worm and the worm wheel are engaged with each other; and the control panel is electrically connected to the battery, the toggle switch, and the micro motor.

As a preference, a diamond-shaped limiting block is arranged in the outer shell; a 7-shaped gap is arranged on a side end surface of the bevel spring bolt; an inverted 7-shaped gap with an avoiding slot is arranged on a side end surface of the lock bar; and two ends of the diamond-shaped limiting block are respectively clamped with the 7-shaped gap and the inverted 7-shaped gap.

As a preference, the outer shell is provided with a password unlocking module; the password unlocking module is electrically connected to the electrical control device; the password unlocking module includes a numeric button, an unlocking button, and a locking button; the unlocking button and the locking button are arranged below the numeric button; and the locking button is arranged on one side of the unlocking button.

As a preference, the outer shell is provided with a battery power display light bar; the battery power display light bar is located on one side of the electronic peep hole; and the battery power display light bar is electrically connected to the control panel.

Compared with the prior art, the present disclosure has the beneficial effects below:

According to the novel intelligent lock for the recreational vehicle provided by the present disclosure, the fingerprint recognition module is arranged at the inclination angle to adapt to a gesture action to tap a recognition region for fingerprint unlocking, so that the intelligent lock is convenient to use and easy to operate. A situation outside the recreational vehicle can be observed through the electronic peep hole, and images outside the recreational vehicle can be observed in real time through a client APP, which improves the safety of use of the recreational vehicle.

In order to describe the structural features and effects of the present disclosure more clearly, the present disclosure is described in detail below in combination with the accompanying drawings and specific embodiments.

1: recreational vehicle lock body; 2: lock cylinder device; 201: bevel spring bolt; 202: lock bar; 203: spring; 204: connecting rod; 205: square hole; 206: diamond-shaped limiting block; 207: 7-shaped gap; 208: inverted 7-shaped gap; 209: avoiding slot; 3: electrical control device; 301: control panel; 302: micro motor; 303: worm wheel; 304: worm; 305: toggle switch; 306: battery; 4: fingerprint recognition module; 5: electronic peep hole; 6: outer shell; 7: inner shell; 8: handle assembly; 801: inner handle; 802: outer handle; 803: inner swing arm; 804: outer swing arm; 805: second mechanical lock; 9: double locking assembly; 901: rotating column; 902: manual double locking shank; 903: first mechanical lock; 904: protruding portion; 10: password unlocking module; 101: numeric button; 102: unlocking button; 103: locking button; and 11: battery power indicator light bar.

DETAILED DESCRIPTION OF THE EMBODIMENTS

Unless otherwise defined, all technical and scientific terms used herein have the same meaning as those normally understood by a person skilled in the art of the present disclosure. The terms used herein in the specification of the present disclosure are for the purpose of describing specific embodiments only and are not intended to limit the present disclosure. The terms "including", "having" and any variation thereof in the specification and claims of the present disclosure and in the illustration above are intended to cover non-exclusive inclusion. The terms "first", "second", and the like in the specification and claims of the present disclosure and the above drawings are used to distinguish similar objects, and are not intended to describe a specific sequence.

The "embodiment" mentioned herein means that specific features, structures or characteristics described in combination with the embodiments may be included in at least one embodiment of the present disclosure. This phrase appearing at each position in the description does not refer to the same embodiment, and is not an independent or candidate embodiment mutually exclusive with other embodiments. Those skilled in the art can explicitly and implicitly understand that the embodiments described herein may be combined with other embodiments.

Figure 1:
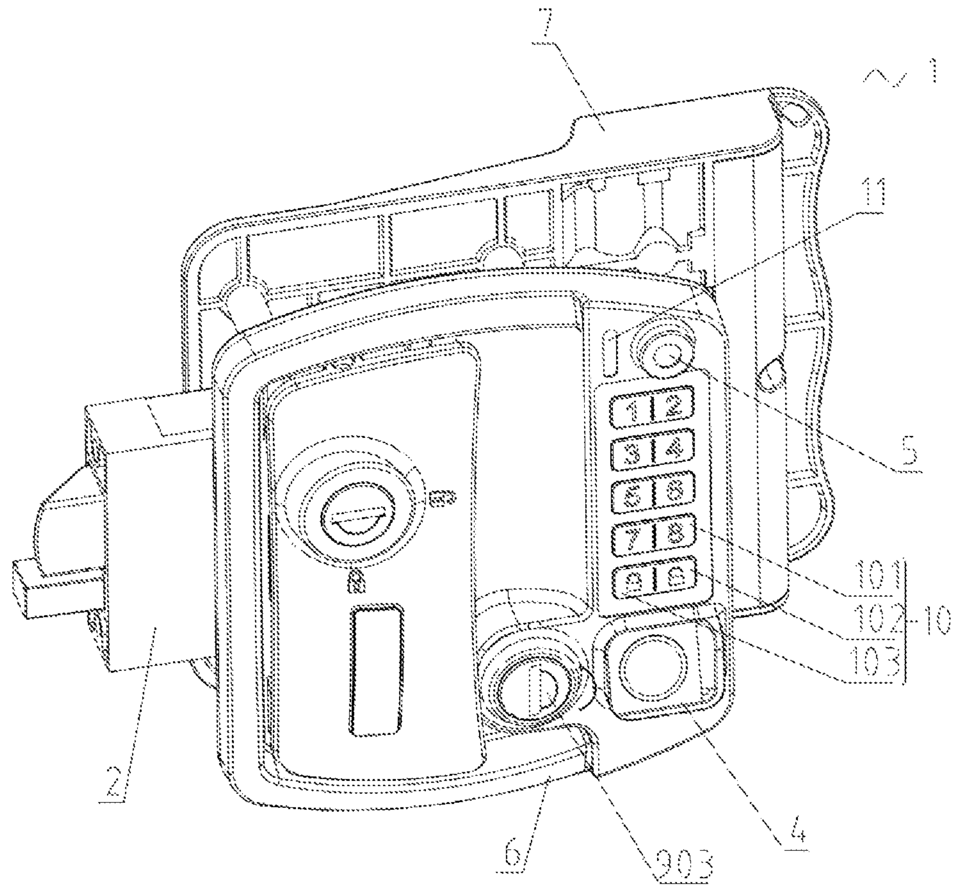
FIG. 1 is a schematic diagram of a three-dimensional structure at a first viewing angle according to the present disclosure.
Figure 2:
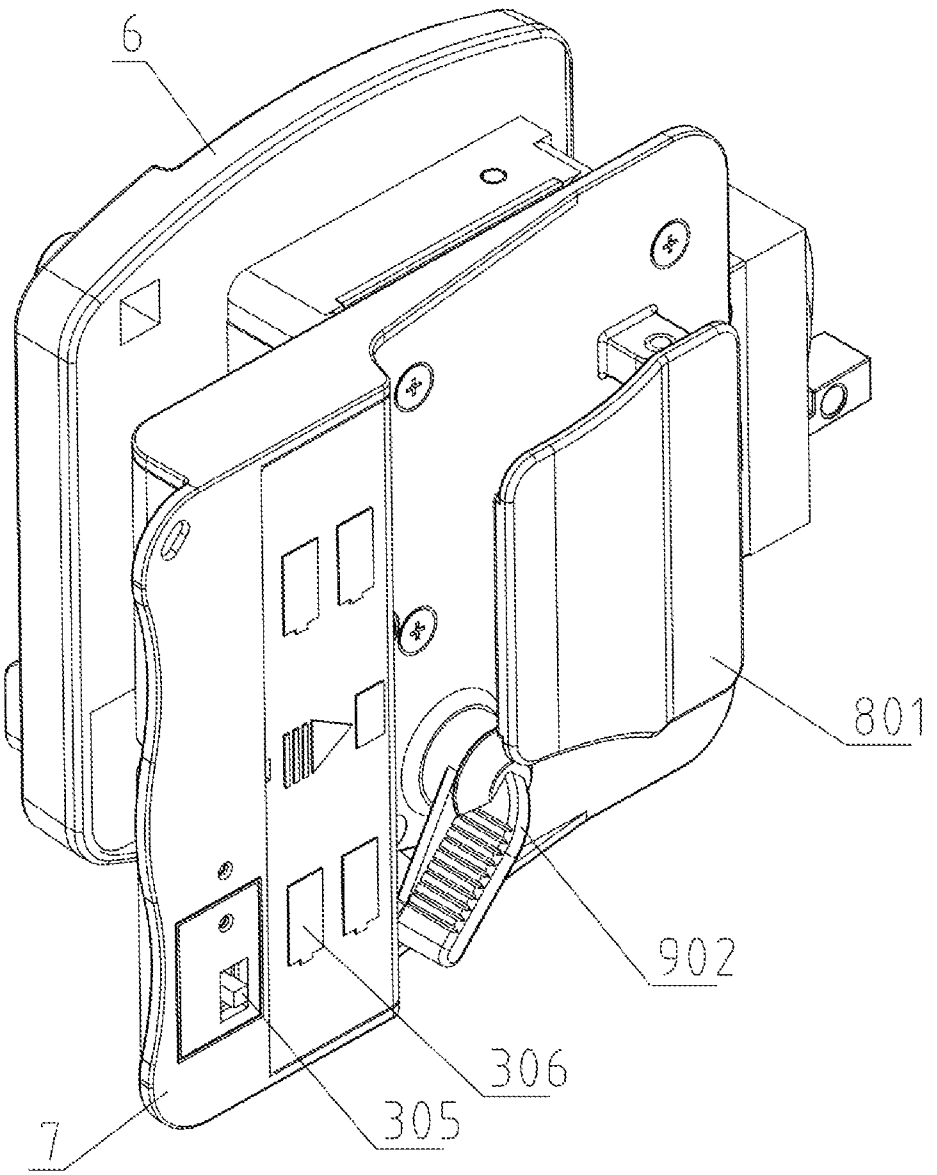
FIG. 2 is a schematic diagram of a three-dimensional structure at a second viewing angle according to the present disclosure.
Figure 3:
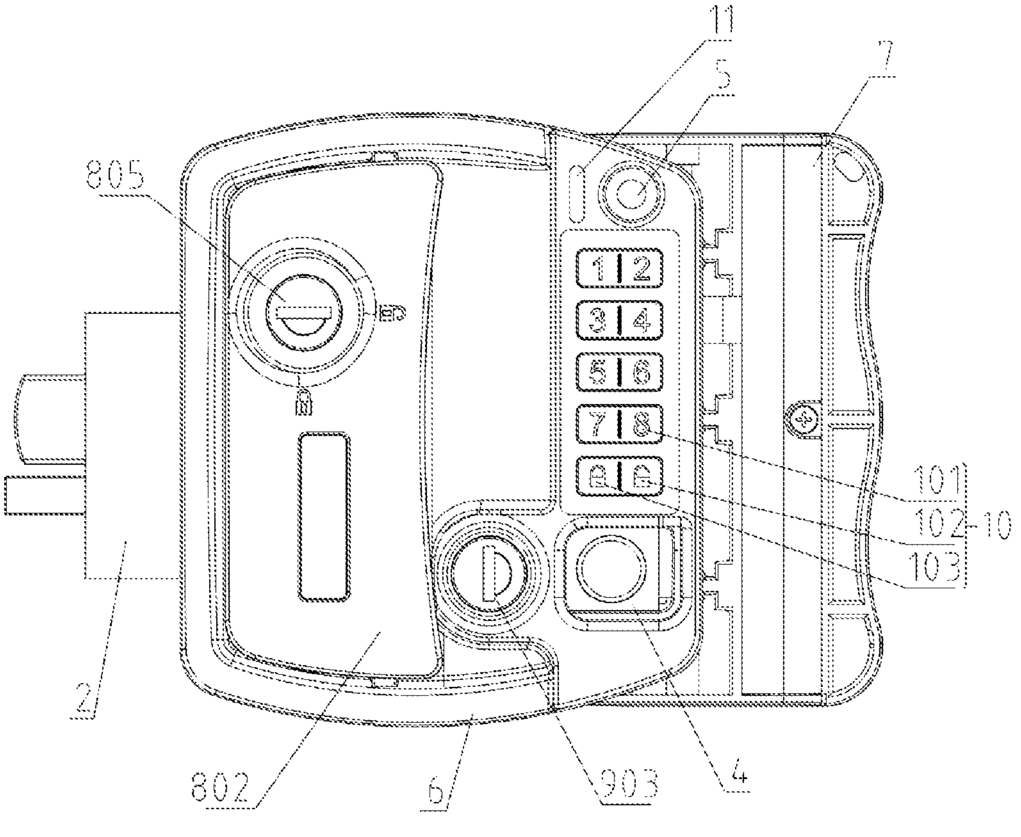
FIG. 3 is a schematic structural diagram of a top view of FIG. 1.
Figure 4:
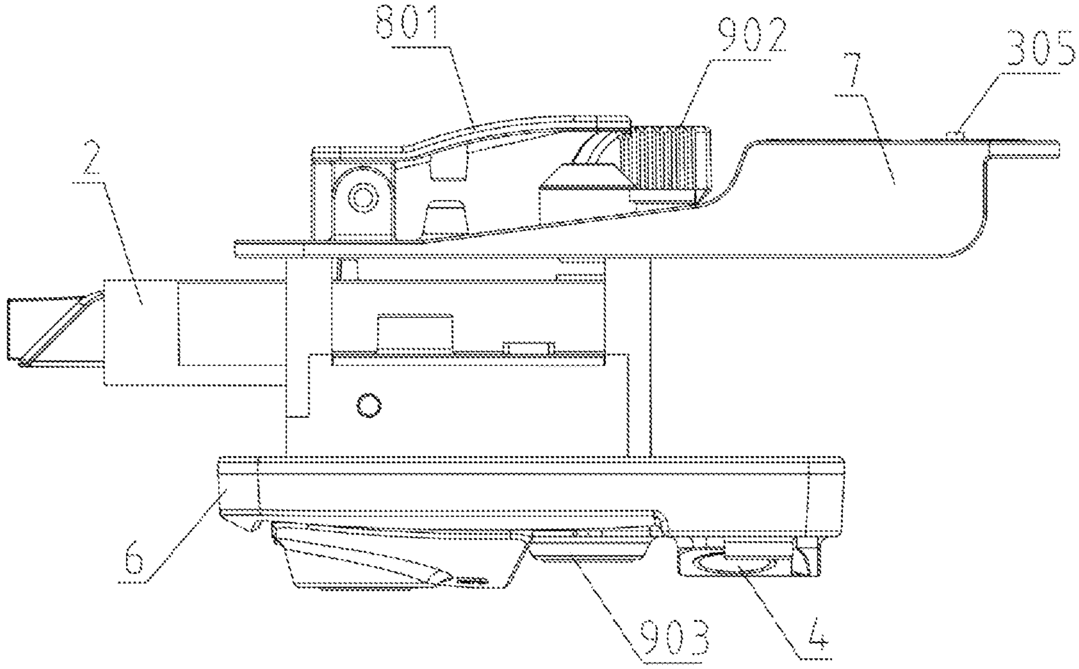
FIG. 4 is a schematic structural diagram of a top view of FIG. 1.
Figure 5:
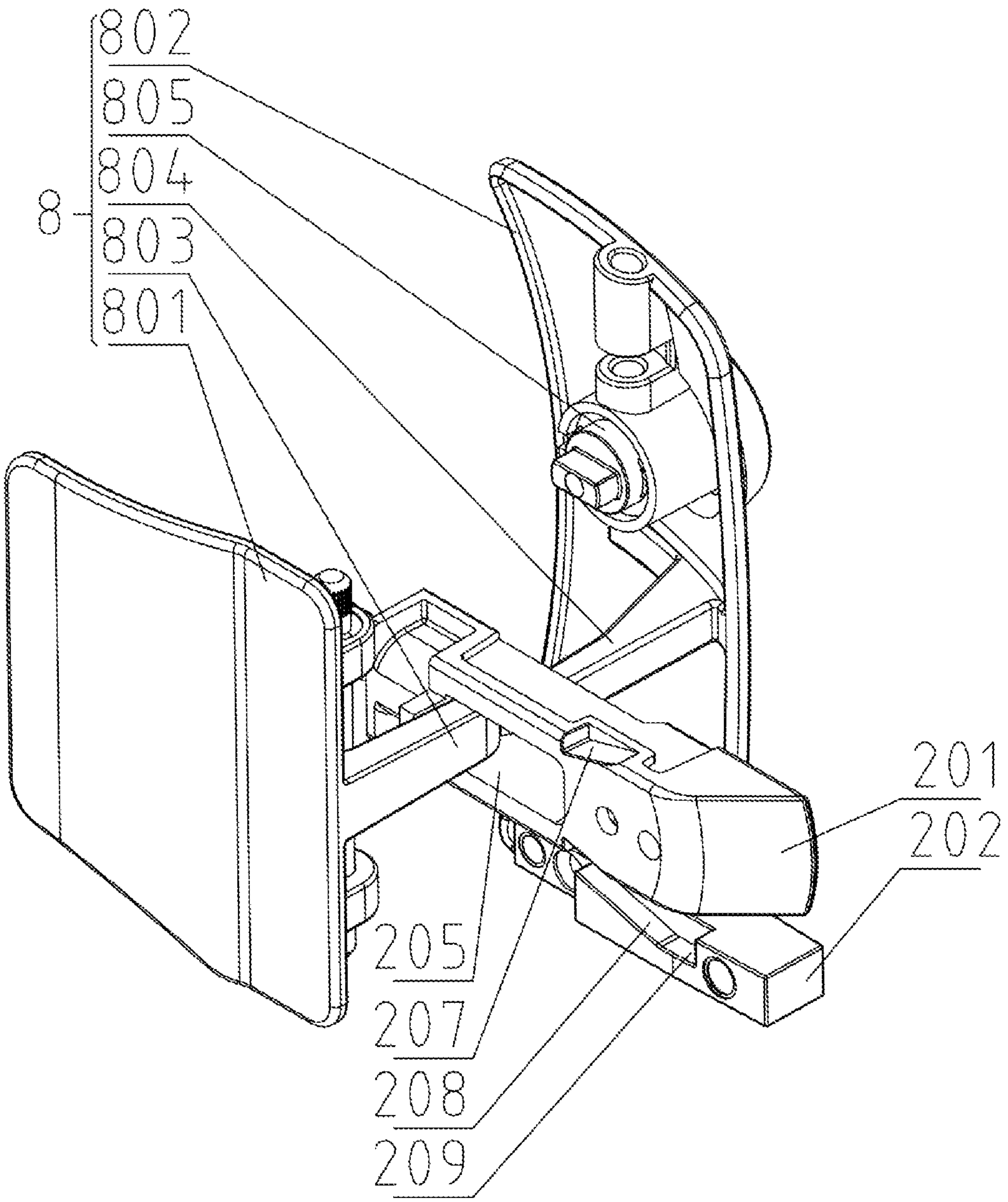
FIG. 5 is a schematic diagram of a three-dimensional structure of cooperation between a handle assembly and a bevel spring bolt in the present disclosure.
Figure 6:
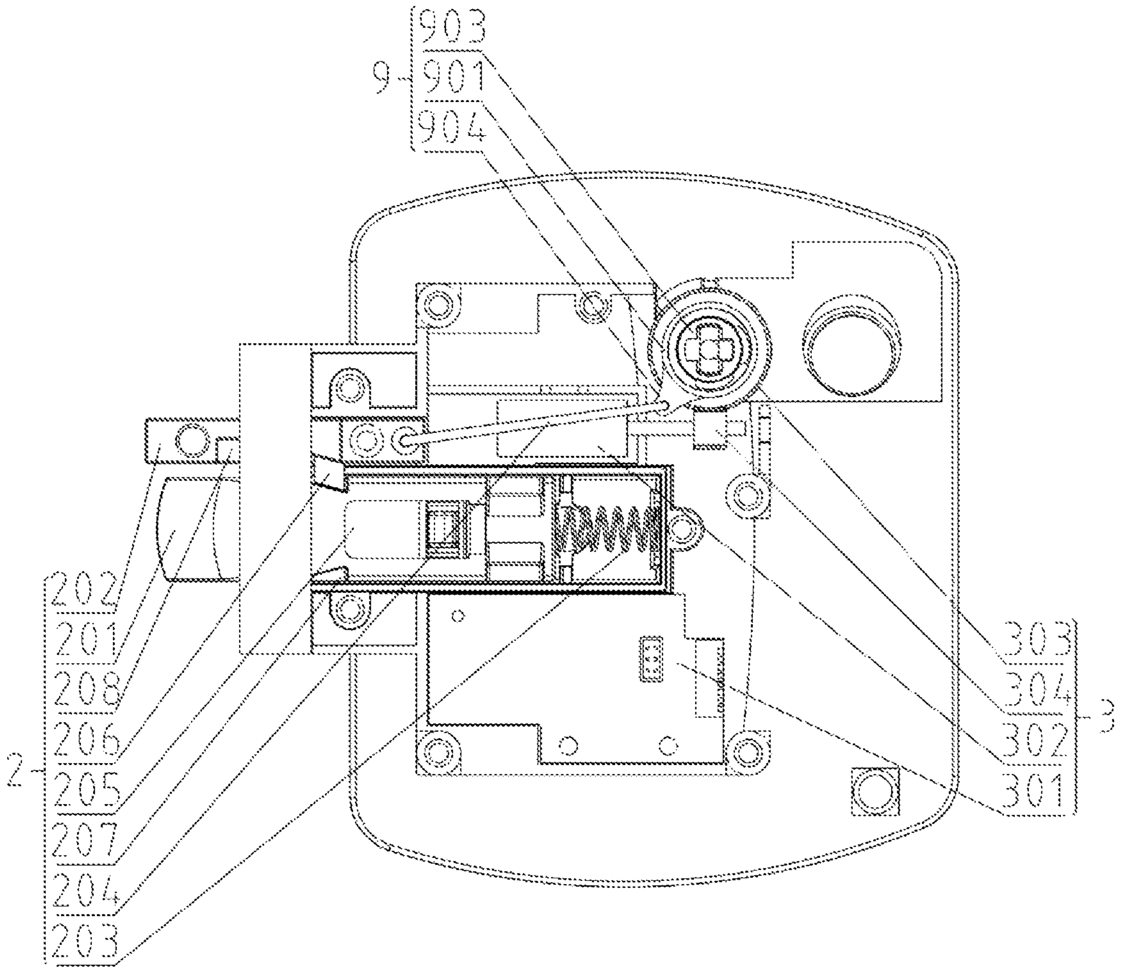
FIG. 6 is a schematic diagram of an internal structure of the present disclosure.

In order to achieve the above objective, an embodiment of the present disclosure provides a novel intelligent lock for a recreational vehicle, as shown in FIG. 1 to FIG. 6, including a recreational vehicle lock body 1. A lock cylinder device 2 is arranged on one side of the recreational vehicle lock body 1. An electrical control device 3 is arranged in the recreational vehicle lock body 1. The recreational vehicle lock body 1 is provided with a fingerprint recognition module 4 with an inclination angle. An electronic peep hole 5 capable of observing an external situation is arranged on one side of the fingerprint recognition module 4. The electrical control device 3 is electrically connected to the fingerprint recognition module 4 and the electronic peep hole 5. The electrical control device 3 is connected to the lock cylinder device 2.

In this embodiment, for the problems of complex unlocking and low safety in an existing recreational vehicle, the fingerprint recognition module 4 and the electronic peep hole 5 are provided. The fingerprint recognition module 4 includes a fingerprint recognition module mounted on an outer surface and a fingerprint library that has stored fingerprints. A real-time fingerprint image obtained through the fingerprint recognition module is compared with the fingerprints in the fingerprint library. If it is recognized that the fingerprint is correct, the lock cylinder device 2 is controlled through the electrical control device 3 to achieve unlocking. The fingerprint recognition module is arranged at an inclination angle to adapt to a gesture action to tap a recognition region for fingerprint unlocking. The intelligent lock is convenient to use and easy to use. The electronic peep hole 5 provided can be configured to observe a situation outside the recreational vehicle. The electronic peep hole 5 is connected to a client APP using Bluetooth, and images, captured in real time by the electronic peep hole 5, outside the recreational vehicle are output to the client APP. In this way, the situation outside the recreational vehicle can be observed in real time to determine whether there is a danger outside the recreational vehicle, whether to open a vehicle door, and the like, which improves the safety of use of the recreational vehicle.

The recreational vehicle lock body 1 includes an outer shell 6, an inner shell 7, and a handle assembly 8. The outer shell 6 is detachably fastened and connected to the inner shell 7. The lock cylinder device 2 is located on a back surface of the outer shell 6. The handle assembly 8 is arranged on the outer shell 6 and the inner shell 7. The lock cylinder device 2 includes a bevel spring bolt 201, a lock bar 202, a spring 203, a connecting rod 204, and a double locking assembly 9. The bevel spring bolt 201 capable of extending and retracting laterally and the lock bar 202 are arranged in the outer shell 6. The lock bar 202 is located on one side of the bevel lock bar 201. A tail end of the bevel lock bar 201 resists against and is provided with the spring 203, so that the spring 203 pushes the bevel spring bolt 201 to extend outwards. The double locking assembly 9 is arranged on a rear side of the lock bar 202. The double locking assembly 9 is movably connected to the lock bar 202 through the connecting rod 204. The bevel spring bolt 201 is laterally movably connected to the handle assembly 8.

The handle assembly 8 includes an inner handle 801 and an outer handle 802. The inner shell 7 is provided with the inner handle 801 connected to a lateral rotating shaft. The outer shell 6 is provided with the outer handle 802 connected to the lateral rotating shaft. A square hole 205 is formed in the bevel spring bolt 201. An inner swing arm 803 is arranged on one surface of the inner handle 801. An outer swing arm 804 is arranged on one surface of the outer handle 802. A tail end of the inner swing arm 803 and a tail end of the outer swing arm 804 are both located in the square hole 205. During use in the recreational vehicle, the inner handle 801 is pulled. The inner handle 801 rotates in one direction along the lateral shaft, and the inner swing arm 803 located in a lateral direction does arc rotation to drive the bevel spring bolt 201 to inwards retract. After the inner handle 801 is released, the bevel spring bolt 201 is reset to extend outwards. During use outside the recreational vehicle, the outer handle 802 is pulled. The outer handle 802 rotates in one direction along the lateral shaft, and the outer swing arm 804 located in the lateral direction does arc rotation to drive the bevel spring bolt 201 to inwards retract. After the outer handle 802 is released, the bevel spring bolt 201 is reset to extend outwards. The tail end of the inner swing arm 803 and the tail end of the outer swing arm 804 are always maintained in the square hole 205.

A second mechanical lock 805 is arranged on the outer handle 802. An end portion of the second mechanical lock 805 is in limiting connection to an inner side end of the outer handle 802. For example, outside the recreational vehicle, the second mechanical lock 805 is locked through a key. A limiting block arranged at a tail end of the second mechanical lock 805 achieves limitation by being clamped to a shaft connection position where the outer handle 802 is located, so that the outer handle 802 cannot swing in one direction, and a stranger is prevented from moving the outer handle 802 or damaging the outer handle 802 at a will.

The double locking assembly 9 includes a rotating column 901, a manual double locking shank 902, and a first mechanical lock 903. The outer shell 6 is provided with the first mechanical lock 903. A tail end of the first mechanical lock 903 is connected and provided with the rotating column 901. The inner shell 7 is provided with the manual double locking shank 902. The manual double locking shank 902 is in fool-proofing plugging with the rotating column 901. An outer side wall of the rotating column 901 is integrally connected with a protruding portion 904. The protruding portion 904 is connected to the connecting rod 204. During use, inside the recreational vehicle, double locking is achieved by rotating the manual double locking shank 902, and the rotating column 901 is driven to rotate clockwise. The connecting rod 204 driven by the protruding portion 904 drives the lock bar 202 to extend out laterally, and a door of the recreational vehicle is locked. Outside the recreational vehicle, the first mechanical lock 903 is unlocked using a key, and the rotating column 901 is driven to rotate anti-clockwise. In this way, the protruding portion 904 pulls the connecting rod 204 to drive the lock bar 202 to retract laterally, and the door of the recreational vehicle is opened.

In this embodiment, a diamond-shaped limiting block 206 is arranged in the outer shell 6. A 7-shaped gap 207 is arranged on a side end surface of the bevel spring bolt 201. An inverted 7-shaped gap 208 with an avoiding slot 209 is arranged on a side end surface of the lock bar 202. Two ends of the diamond-shaped limiting block 206 are respectively clamped with the 7-shaped gap 207 and the inverted 7-shaped gap 208. When the manual double locking shank 902 achieves double locking, the inverted 7-shaped gap 208 can block the diamond-shaped limiting block 206. The diamond-shaped limiting block 206 is used to be clamped with the 7-shaped gap 207, so that both the bevel spring bolt 201 and the lock bar 202 cannot move, and the recreational vehicle door is locked. When the manual double locking shank 902 is reset, the avoiding slot 209 on the inverted 7-shaped gap 208 has a space for receiving the diamond-shaped limiting block 206. The inner handle 801 or the outer handle 802 is pulled in one way to drive the bevel spring bolt 201 to retract and move inwards, and the door of the recreational vehicle is opened.

Further, the electrical control device 3 includes a control panel 301, a battery 306, a toggle switch 305, a micro motor 302, a worm wheel 303, and a worm 304. The control panel 301 is arranged inside the inner shell 7. The battery 306 is arranged on one side of the control panel 301. The toggle switch 305 is arranged on an end surface of the inner shell 7. The micro motor 302 is fixedly mounted in the outer shell 6. An output end of the micro motor 302 is connected and provided with the worm 304. The outer side wall of the rotating column 901 is fixedly sleeved with the worm wheel 303 with oblique teeth. The worm 304 and the worm wheel 303 are engaged with each other. The control panel 301 is electrically connected to the battery 306, the toggle switch 305, and the micro motor 302.

In this embodiment, in order to facilitate a user to use the recreational vehicle lock body 1, there is also an electrical control manner in addition to the mechanical unlocking manner. The electrical control manner includes the above fingerprint recognition module 4 and a password unlocking module 10. When authentication of the fingerprint recognition module 4 or the password unlocking module 10 succeeds, the control panel 301 controls the worm 304 on the micro motor 302 to rotate, which drives the engaged worm wheel 303 to rotate, thus driving the rotating column 901 to rotate to achieve the above extending or retracting function of the lock bar 202.

The outer shell 6 is provided with the password unlocking module 10. The password unlocking module 10 is electrically connected to the electrical control device 3. The password unlocking module 10 includes a numeric button 101, an unlocking button 102, and a locking button 103. The unlocking button 102 and the locking button 103 are arranged below the numeric button 101. The locking button 103 is arranged on one side of the unlocking button 102. By means of setting of a personal password, for example, a six-number password or an eight-number password. If an input password is correct, the control panel 301 controls the micro motor 302 to achieve the extending or retracting function of the lock bar 202.

Further, the outer shell 6 is provided with a battery power indicator light bar 11. The battery power indicator light bar 11 is located on one side of the electronic peep hole 5. The battery power display light bar 11 is electrically connected to the control panel 301, so as to check and know a battery status of the battery 306.

In summary, according to the novel intelligent lock for the recreational vehicle provided by the present disclosure, the recreational vehicle lock body 1 is further designed with the password unlocking module 10 and the fingerprint recognition module 4 for selection by a user. The fingerprint recognition module 4 is arranged at the inclination angle to adapt to a gesture action to tap the recognition region for fingerprint unlocking, so that the intelligent lock is convenient to use and easy to operate. A situation outside the recreational vehicle can be observed through the electronic peep hole 5, and images outside the recreational vehicle can be observed in real time through the client APP, which improves the safety of use of the recreational vehicle.

The above describes the technical principles of the present disclosure in conjunction with specific embodiments, and only describes preferred implementations of the present disclosure. The protection scope of the present disclosure is not limited to the above embodiments, and all technical solutions under the concept of the present disclosure belong to the protection scope of the present disclosure. Other specific implementations of the present disclosure that can be thought by a person skilled in the art without creative work shall all fall within the protection scope of the present disclosure.

What is claimed is:

1. An intelligent lock for a recreational vehicle, comprising a recreational vehicle lock body, wherein a lock device is arranged on one side of the recreational vehicle lock body; an electrical control device is arranged in the recreational vehicle lock body; the recreational vehicle lock body is provided with a fingerprint recognition module with an inclination angle; an electronic peep hole capable of observing an external situation is arranged on one side of the fingerprint recognition module; the electrical control device is electrically connected to the fingerprint recognition module and the electronic peep hole; and the electrical control device is connected to the lock device;

wherein the recreational vehicle lock body comprises an outer shell, an inner shell, and a handle assembly; the outer shell is detachably fastened and connected to the inner shell; the lock device is located on a back surface of the outer shell; and the handle assembly is arranged on the outer shell and the inner shell;

wherein the lock device comprises a bevel spring bolt, a lock bar, a spring, a connecting rod, and a double locking assembly; the bevel spring bolt capable of extending and retracting laterally and the lock bar are arranged in the outer shell; the lock bar is located on one side of the bevel lock bar; a tail end of the bevel spring bolt resists against and is provided with the spring, so that the spring pushes the bevel spring bolt to extend outwards; the double locking assembly is arranged on a rear side of the lock bar; the double locking assembly is movably connected to the lock bar through the connecting rod; and the bevel spring bolt is laterally movably connected to the handle assembly;

wherein a diamond-shaped limiting block is arranged in the outer shell; a 7-shaped gap is arranged on a side end surface of the bevel spring bolt; an inverted 7-shaped gap with an avoiding slot is arranged on a side end surface of the lock bar; and when the double locking assembly is locked to push the lock bar to an extended position, two ends of the diamond-shaped limiting block are respectively clamped with the 7-shaped gap and the inverted 7-shaped gap so as to prevent the bevel spring bolt and the lock bar from moving; and when the double locking assembly is unlocked, the diamond-shaped limiting block is received in the avoiding slot to release the bevel spring bolt so that the bevel spring bolt can be driven by the handle assembly to retract to a retracted position.

2. The intelligent lock for the recreational vehicle according to claim 1, wherein the handle assembly comprises an inner handle and an outer handle; the inner shell is provided with the inner handle connected to a first lateral rotating shaft; the outer shell is provided with the outer handle connected to a second lateral rotating shaft; a square hole is formed in the bevel spring bolt; an inner swing arm is arranged on one surface of the inner handle; an outer swing arm is arranged on one surface of the outer handle; and a tail end of the inner swing arm and a tail end of the outer swing arm are both located in the square hole, so that when the inner handle is pulled to rotate, the inner swing arm swings to drive the bevel spring bolt to inwards retract, or when the outer handle is pulled to rotate, the outer swing arm swings to drive the bevel spring bolt to inwards retract.

3. The intelligent lock for the recreational vehicle according to claim 2, wherein a second mechanical lock is arranged on the outer handle; and an end portion of the second mechanical lock is in limiting connection to an inner side end of the outer handle.

4. The intelligent lock for the recreational vehicle according to claim 1, wherein the double locking assembly comprises a rotating column, a manual double locking shank, and a first mechanical lock; the outer shell is provided with the first mechanical lock; a tail end of the first mechanical lock is connected and provided with the rotating column; the inner shell is provided with the manual double locking shank; the manual double locking shank is in fool-proofing plugging with the rotating column; an outer side wall of the rotating column is integrally connected with a protruding portion; and the protruding portion is connected to the connecting rod.

5. The intelligent lock for the recreational vehicle according to claim 4, wherein the electrical control device comprises a control panel, a battery, a toggle switch, a micro motor, a worm wheel, and a worm; the control panel is arranged inside the inner shell; the battery is arranged on one side of the control panel; the toggle switch is arranged on an end surface of the inner shell; the micro motor is fixedly mounted in the outer shell; an output end of the micro motor is connected and provided with the worm; the outer side wall of the rotating column is fixedly sleeved with the worm wheel with oblique teeth; the worm and the worm wheel are engaged with each other; and the control panel is electrically connected to the battery, the toggle switch, and the micro motor.

6. The intelligent lock for the recreational vehicle according to claim 1, wherein the outer shell is provided with a password unlocking module; the password unlocking module is electrically connected to the electrical control device; the password unlocking module comprises a numeric button, an unlocking button, and a locking button; the unlocking button and the locking button are arranged below the numeric button; and the locking button is arranged on one side of the unlocking button.

7. The intelligent lock for the recreational vehicle according to claim 1, wherein the outer shell is provided with a battery power indicator light bar; the battery power indicator light bar is located on one side of the electronic peep hole; and the battery power display light bar is electrically connected to the control panel.

* * * * *